J. HIGGINBOTTOM.
APPARATUS FOR SEPARATING SMALL PARTICLES FROM LARGER PARTICLES.
APPLICATION FILED APR. 14, 1905.

1,022,587.

Patented Apr. 9, 1912.
3 SHEETS—SHEET 1.

J. HIGGINBOTTOM.
APPARATUS FOR SEPARATING SMALL PARTICLES FROM LARGER PARTICLES.
APPLICATION FILED APR. 14, 1905.

1,022,587.

Patented Apr. 9, 1912.
3 SHEETS—SHEET 2.

J. HIGGINBOTTOM.
APPARATUS FOR SEPARATING SMALL PARTICLES FROM LARGER PARTICLES.
APPLICATION FILED APR. 14, 1905.
1,022,587.
Patented Apr. 9, 1912.
3 SHEETS—SHEET 3.
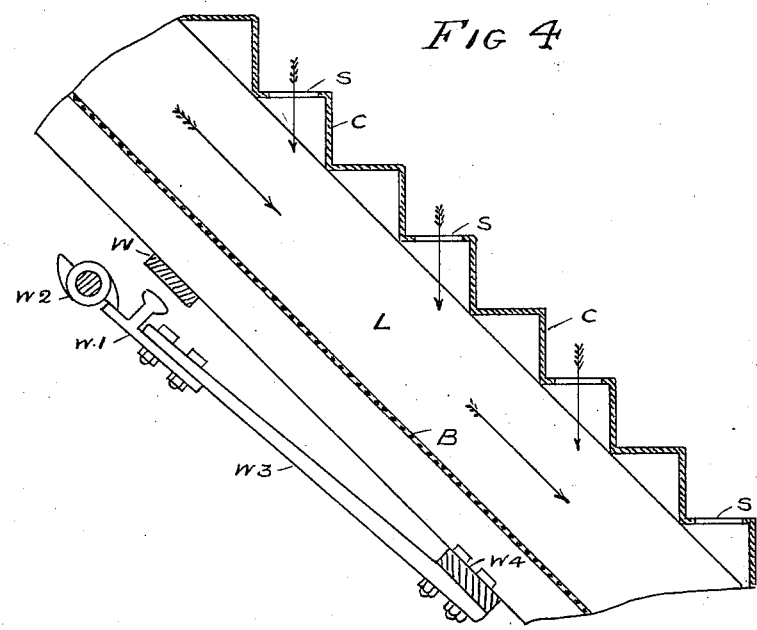
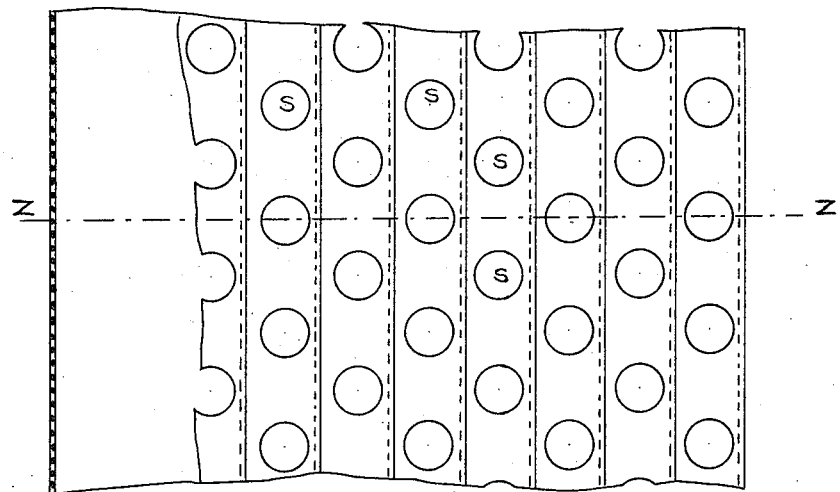

UNITED STATES PATENT OFFICE.

JAMES HIGGINBOTTOM, OF LIVERPOOL, ENGLAND.

APPARATUS FOR SEPARATING SMALL PARTICLES FROM LARGER PARTICLES.

1,022,587. Specification of Letters Patent. Patented Apr. 9, 1912.

Application filed April 14, 1905. Serial No. 255,610.

*To all whom it may concern:*

Be it known that I, JAMES HIGGINBOTTOM, a subject of the King of Great Britain, residing at Liverpool, in the county of Lancaster, in the Kingdom of England, milling engineer, have invented certain new and useful Improvements in Apparatus for Separating Small Particles from Larger Particles, for which application has been made in Great Britain, No. 8,776, dated April 16, 1904.

This invention has for its object the separation of small particles from larger particles by means of gauze surfaces, air jet orifices and circulating air currents.

In carrying out my invention I arrange so that the material to be separated passes a gauze surface having air currents or a series of air jets impinging thereon, in such manner that the smaller particles are blown or sucked through the meshes of the gauze, and I carry this into effect as follows: I use an inclined gauze surface on the side of a first chamber and I arrange the material to be separated to pass downward over its surface by means of gravity; during its descent the material is subjected to a series of jets of air, or air currents so arranged that the air carries the smaller particles of the material through the meshes of the gauze; I also arrange so that the air with its contained smaller particles which has passed through the gauze, shall pass into a second chamber where the heaviest of the small particles become deposited, from such second chamber, the lighter of the small particles passes through a fan or other air propeller again into the first air chamber, in which the lightest of the small particles are deposited; thus the air is continually circulated in the machine itself.

Figure 1:
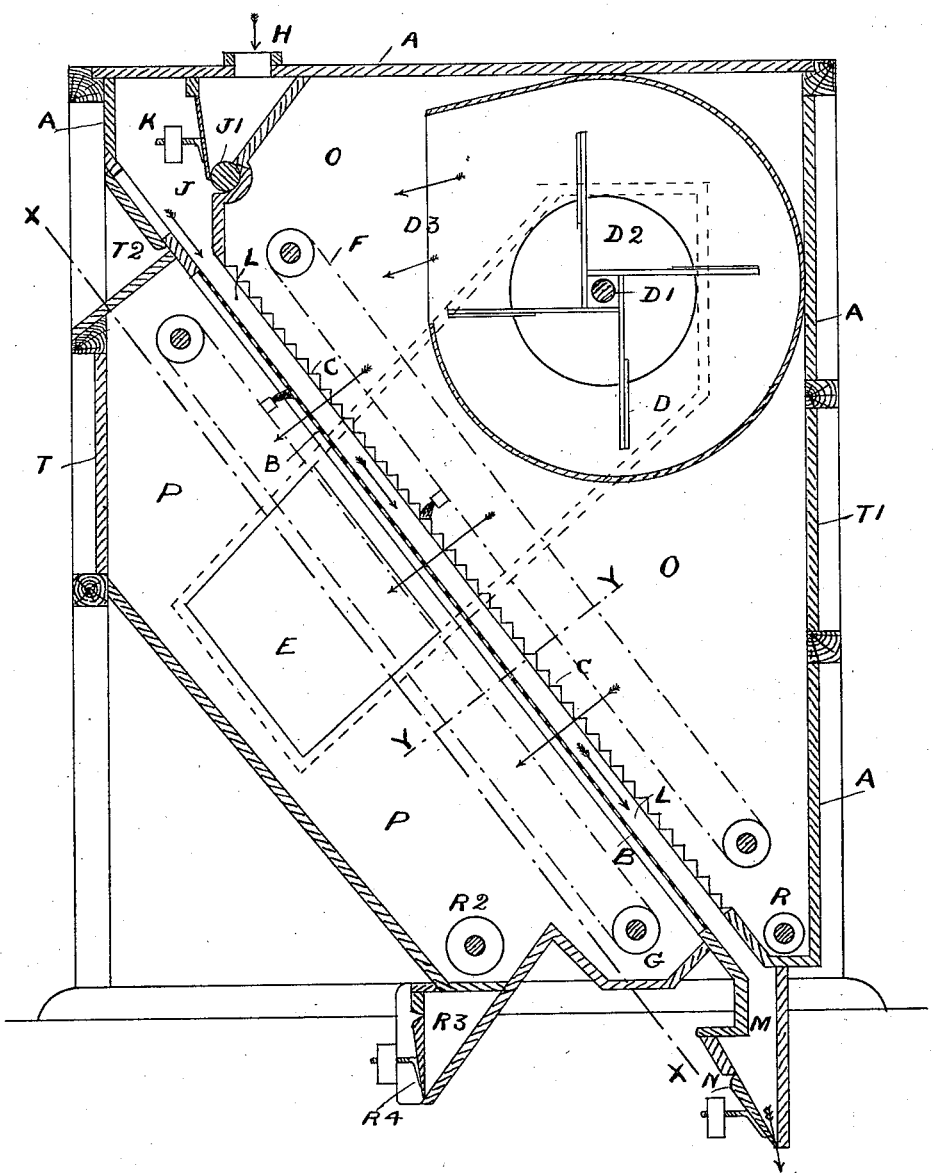
Figure 2:
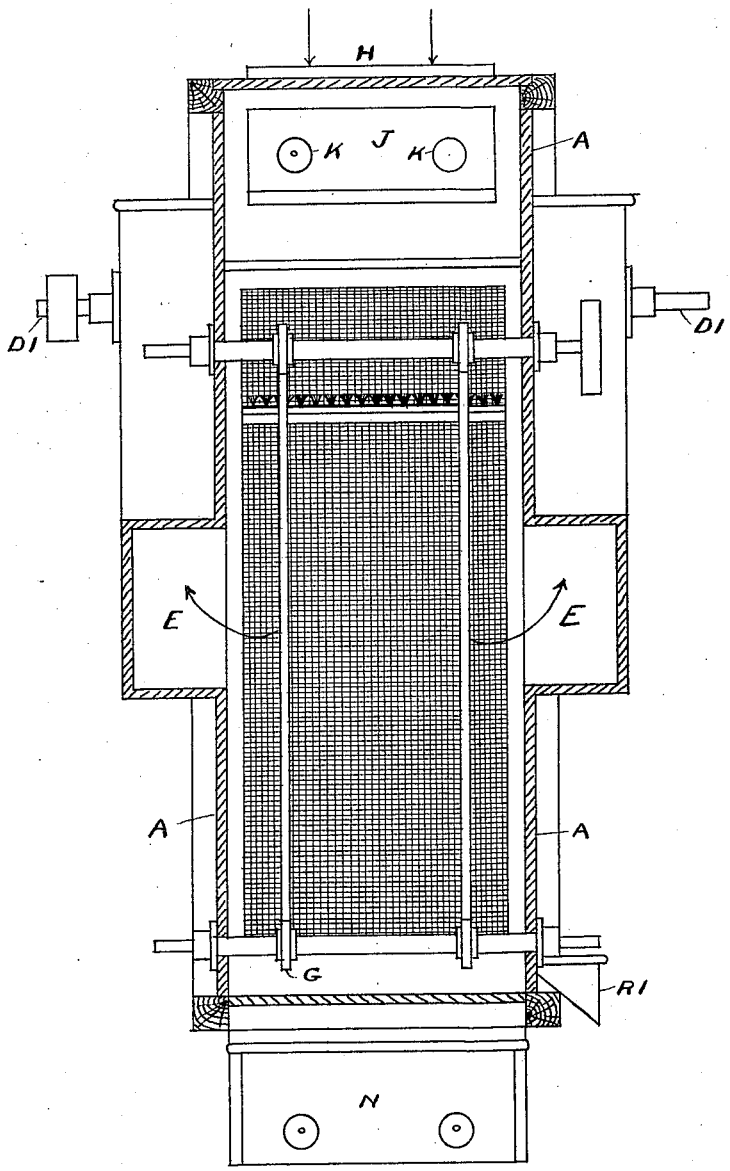

In the accompanying drawings—Figure 1 is a longitudinal vertical section; Fig. 2 is a transverse section of Fig. 1 on the line $x$—$x$; Fig. 3 is an enlarged sectional plan on the lines $y$—$y$ of Fig. 1. Fig. 4 is a section on the line $z$—$z$ of Fig. 3.

In Figs. 1 and 2, A is the outer casing or framing of the machine, B is the inclined stationary gauze surface, C is a diaphragm having a series of air jet orifices therein. D is a fan driven by the shaft D' and having fan eyes $D^2$. E E are air conduits. F is a traveling brush apparatus for keeping the air jet holes from becoming choked. G is a similar traveling brush apparatus to keep the meshes of the gauze from becoming choked. H is the aperture for admitting the feed material to the machine. J is a hinged valve having balancing weights K K. The valve J works in conjunction with the feed roll $J^1$ to admit and spread the incoming feed upon the gauze surface also to prevent the ingress and egress of air. L is the space between the inclined gauze surface B and the diaphragm C for the downward passage of the falling material which is to be separated. M is the outlet for the large particles which do not pass through the gauze surface. N is a weighted and balanced valve to permit the outpassage of the large particles and to prevent the egress of air. O is the first air chamber. P is the second air chamber. R is a conveyer for collecting the lighter particles which are deposited in the first chamber O, and for carrying the same to the discharge box $R^1$ on the outside of the machine. $R^2$ is a conveyer for collecting the heavier particles which are deposited in the second chamber P and for carrying the same to the discharge box $R^3$ which is on the outside of the machine, and fitted with a balanced air valve $R^4$ to allow the separated heavier particles to be discharged and to prevent the egress or ingress of air. T $T^1$ and $T^2$ are doors on the sides of the framing to obtain access to the interior of the machine.

Figs. 3 and 4 show a diaphragm C with space L and with a gauze surface B to an enlarged scale. I preferably make the diaphragm C of sheet metal in a corrugated form having a series of orifices S S S placed diagonally to each other as shown on the Fig. 3, because the orifices are thus more equally distributed and more easily kept free from choking, also the jets of air passing through each orifice impinges in a downward direction upon the falling material which considerably adds to the efficiency of the machine when it is treating material of a soft or claggy nature. In these figures, a knocking or tapping apparatus is also applied to the frame of the gauze sieve to assist in keeping the same free from choking during work. W is a cross bar attached to the sieve frame. $W^1$ is a knocker actuated by the revolving cam $W^2$, which strikes the cross bar according to the number of revolutions of the cam $W^2$ and the strength of the carrying spring W³ which is attached by the carrying bar W⁴ to the frame of the machine.

Referring to Figs. 1 and 2. The mode of action is as follows:—The material to be separated is fed into the machine through the feed aperture H, the balanced valve J and the feed roll J¹ spreads the feed over the upper part of the gauze surface B, and the material passes downward by gravity over the gauze surface B. The fan D draws its air through the conduits E E, from the second chamber P, and discharges the same through the fan discharge aperture D³ into the first air chamber O, the air leaves the air chamber O and passes through the jet orifices in the diaphragm C, and through the material falling in the space L and from thence through the meshes of the gauze into the second chamber P—thus forming an air circuit. The air in passing through the falling material carries with it the particles which can pass through the meshes of the gauze into the chamber P, in the chamber P the heaviest of the particles becomes deposited and are removed therefrom by the collecting conveyer R² and the discharge box R³ to the outside of the machine. The lightest of the particles which have entered the chamber P, are carried by the air current through the conduits E E, and through the fan into the first chamber O, where they become deposited and are removed therefrom by means of the conveyer R and the discharge box R¹ to the outside of the machine. The large particles of the feed material which cannot pass through the gauze fall by gravity into the discharge box M and pass from thence to the outside of the machine. In some cases I may dispense with the use of the collecting conveyers R and R², and use only the discharge boxes R¹ and R³ or their equivalents. On finer materials of a soft or easily agglomerating nature I preferably use traveling brushes F and G to keep the air jet holes and the meshes of the gauze clear and free from choking.

I declare that what I claim is:—

1. In a separating apparatus, the combination of the fan blowing into the first depositing chamber, the stationary inclined diaphragm having air jet orifices, the stationary inclined screen having the material being separated traveling by gravity over its upper surface and the air current passing through the screen from its upper to its lower surface, the second depositing chamber, the air conduits from the second depositing chamber to the fan, the traveling brush to the diaphragm, and the traveling brush to the screen.

2. In a separating apparatus, the combination of a fan from which air is discharged, a first depositing chamber for receiving the air from the fan and in which small particles are deposited, a stationary inclined diaphragm having air jet orifices through which air passes from the chamber to the screen, a stationary inclined screen upon which the material being separated travels by gravity, and which has air currents passing through from its upper to its lower surface, a second depositing chamber for receiving air and separated particles which have passed through the screen, air conduits from the last named chamber to the fan, a traveling brush to said diaphragm, a traveling brush to said screen, an outer casing, a feed valve, a discharge valve for large particles, and discharge valves for small particles.

In witness whereof, I have hereunto signed my name this 5th day of April 1905, in the presence of two subscribing witnesses.

JAMES HIGGINBOTTOM.

Witnesses:
   H. T. SHOOBRIDGE,
   W. H. BEESTON.

---

Copies of this patent may be obtained for five cents each, by addressing the "Commissioner of Patents, Washington, D. C."